Oct. 11, 1932.  P. G. EDWARDS  1,882,125
TESTING SYSTEM
Filed Feb. 21, 1930
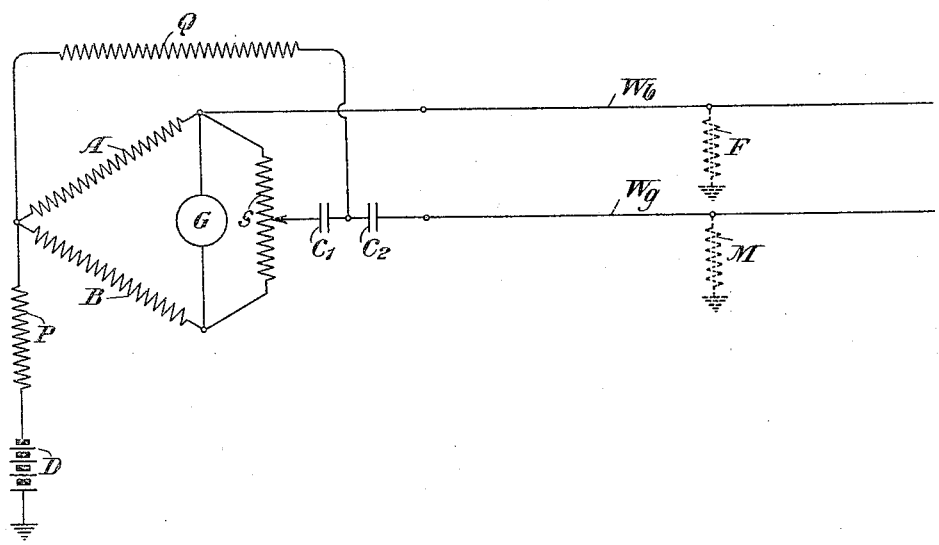
INVENTOR
*P. G. Edwards*
BY
ATTORNEY Patented Oct. 11, 1932

1,882,125

UNITED STATES PATENT OFFICE

PAUL G. EDWARDS, OF BLOOMFIELD, NEW JERSEY, ASSIGNOR TO AMERICAN TELEPHONE AND TELEGRAPH COMPANY, A CORPORATION OF NEW YORK

TESTING SYSTEM

Application filed February 21, 1930. Serial No. 430,359.

This invention relates to testing systems. More particularly this invention relates to arrangements for determining the insulation resistance of a conductor.

Heretofore the insulation resistance of a conductor was determined by comparing its resistance with that of a standard resistance when connected to a galvanometer and a grounded battery which were in series relationship. The connection of the standard resistance caused the galvanometer to become deflected and the deflection was noted. The subsequent connection of the conductor to be tested similarly deflected the moving element of the galvanometer and the relative deflections were used to determine the insulation resistance of the conductor on the theory that the deflections were inversely proportional to the relative resistances.

In such arrangements, galvanometer fluctuations which may be produced by potentials induced from telegraph circuits, particularly those of the simplex and composite variety, and those induced from other circuits, were found to be very troublesome. All of these extraneous effects have been found to greatly affect the speed as well as the accuracy required in determining the insulation resistance of the conductor.

One of the objects of this invention is to provide, in addition to the apparatus heretofore employed for making measurements of the insulation resistance of a conductor, means for neutralizing fluctuations in the galvanometer caused by foreign, induced, or other extraneous currents.

Another object of this invention resides in the provision of an arrangement such that extraneous potentials or induced currents tending to cause galvanometer fluctuations may be neutralized by similar potentials or currents induced in a neutralizing conductor or circuit connected or otherwise coupled to the galvanometer.

This invention will be better understood from the detailed description hereinafter following when read in connection with the accompanying drawing, showing one embodiment of the invention merely for the purpose of illustration.

The drawing shows an arrangement for substantially neutralizing the effects of extraneous voltages often known as "ground potentials" which may interfere with the accurate and speedy determination of the insulation resistance of a conductor. The reference characters A and B represent equal elements of resistance, one end of one of which is connected to an end of the other and these to ground through a resistance P and a source of direct current which may be a battery designated D. The other ends of the resistances A and B are interconnected by a galvanometer G which may be of any well known type, preferably of the D'Arsonval type.

The conductor to be tested, which may, for example, be faulty, is designated $W_b$. One terminal of this conductor is connected to the junction of the galvanometer and the resistance A and its other terminal may be open-ended as shown. A good conductor is designated $W_g$ and this conductor will be employed for the purpose of producing currents or voltages substantially equal to those induced in the conductor $W_b$ so that the galvanometer will be rendered free from the effects of these induced currents or voltages. One terminal of the conductor $W_g$ may be open-ended as is conductor $W_b$. Resistances F and M, shown by dotted lines, may be employed to represent the respective resistances of the conductors $W_b$ and $W_g$ to ground.

All of the resistance of a potentiometer S is bridged across the galvanometer G. One terminal of the conductor $W_g$ is connected in series with a pair of condensers $C_1$ and $C_2$ to the movable contact or element of the potentiometer S. The midpoint of these condensers, i. e., the conductor interconnecting their adjacent electrodes, is connected through a resistance Q to the junction of the resistances A and B. The resistance Q represents a low impedance for direct current as compared with the insulation resistances of either of the condensers $C_1$ or $C_2$. Yet resistance Q interposes a high impedance for alternating currents while condensers $C_1$ and $C_2$ may be of large capacity so as to present low impedances for alternating currents.

The current which emanates from battery

D flows through resistance P through resistance M to ground through two distinct paths. One of these direct current paths includes the resistance Q, the condenser $C_2$ and the conductor $W_g$. The other of these paths includes the combination of resistances A and B, the galvanometer G, potentiometer S, condensers $C_1$ and $C_2$, and the conductor $W_g$. Inasmuch as condenser $C_2$ is in common with these paths, any leakage currents from battery D will be very low. The two paths just described include the resistance Q and the condenser $C_1$, respectively. Both of these elements have very high resistances, the insulation resistance of condenser $C_1$ being considerably greater than resistance Q. Leakage current from battery D will be subdivided between these two paths inversely in accordance with their resistances. Since the condenser $C_1$ interposes a much higher resistance than the element Q, the current which flows from condenser $C_1$ will affect the galvanometer G negligibly, if at all.

Inasmuch as the conductor $W_g$ may ordinarily be better than the conductor $W_b$, the resistance F will ordinarily be smaller than the resistance M. In that case potenials induced on the conductor $W_b$ will be of smaller magnitude than those induced on the conductor $W_g$. Consequently, the movable arm of the potentiometer S will ordinarily be set at some point between the lower terminal of the potentiometer and its midpoint. However, when the resistance F is of neglible magnitude, then practically no voltages will be induced on the conductor $W_b$ so that the movable arm of the potentiometer S will have to be set quite close to its midpoint.

When the conductor $W_g$ has the same insulation resistance to ground as the conductor $W_b$, then equal potentials will be impressed on these conductors. In order that these may produce equal and opposite effects on the galvanometer G, it will be necessary to move the arm of the potentiometer to its lower terminal. If the resistances M and F are both so large as not to appreciably reduce the normal potentials induced between conductors $W_g$ and $W_b$, respectively, to ground, then the movable arm of the potentiometer will have to be set at or very close to its lower terminal.

It will be evident that the required amount of neutralization is attained by properly setting the potentiometer S. The conductor $W_b$ and $W_g$ may induce voltages which will differently affect the galvanometer G, and this invention is made to provide for the elimination of the difference between these potentials. When the proper setting of the potentiometer S is obtained, the potentials impressed on the two sides of the galvanometer will be equal and opposite to those caused by the conductors $W_b$ and $W_g$, and the net voltage from the inducing sources will be zero.

It is to be noted that the conductor $W_g$ will preferably be one in the same quad as the conductor $W_b$. Moreover, a pair of conductors may, if desired, be substituted for the one designated $W_g$, and one end of one of these may be connected to an end of the other, and to one terminal of condenser $C_2$. The two conductors will then be open-circuited at their other ends, as is the conductor $W_g$, shown in the drawing. The pair of conductors should have an insulation resistance to ground comparable with that of the conductor $W_g$.

In determining the insulation resistance to ground of a conductor such as $W_b$, the conductor $W_g$ is removed and a standard, predetermined resistance is connected in place of conductor $W_b$ to the junction of the resistance A and the galvanometer G. The deflection of the galvanometer is noted. Both conductors $W_b$ and $W_g$ may then be connected to the testing apparatus, as shown in the drawing. The potentiometer S is then adjusted so as to eliminate fluctuation in the galvanometer. This is accomplished by carefully setting the movable arm of the potentiometer S until the pointer or moving element of the galvanometer becomes as steady as possible. The deflection of the pointer or moving element of the galvanometer is again noted and compared with the deflection obtained when the standard, predetermined resistance was connected to the apparatus. The ratio of these deflections will determine the magnitude of the insulation resistance to ground of the conductor $W_b$, as is well known.

In an arrangement actually constructed in accordance with the layout of the drawing, the resistance Q was 100,000 ohms, the total resistance of the potentiometer was 4000 ohms, and each of the condensers $C_1$ and $C_2$ had a capacity of 20 microfarads. Fluctuation of the galvanometer was neutralized to a very high degree. It is to be noted that the condenser $C_2$ may, if desired, be omitted, especially if the resistance M is large.

While this invention has been shown in one particular arrangement merely for the purpose of illustration, it will be understood that the features of this invention may be applied to other and widely varied organizations without departing from the spirit of the invention and the scope of the appended claims.

What is claimed is:

1. The method of determining the insulation resistance of a conductor to ground with apparatus including a measuring device which consists in comparing the insulation resistance to ground of the conductor with that of a standard resistance which is grounded while neutralizing the effects of ground potentials on the measuring device of said apparatus.

2. The combination of a galvanometer forming part of a measuring system, a potentiometer shunting the galvanometer, an open-ended, current carrying conductor connected to one terminal of the galvanometer, and another open-ended, current carrying conductor connected to the movable arm of the potentiometer, both conductors lying parallel to each other.

3. An arrangement of apparatus for measuring the insulation resistance of a conductor including, in addition to the measuring apparatus, a potentiometer, the conductor to be measured being connected to a fixed terminal of the potentiometer, the other terminal of the conductor to be measured being open-ended, and a good conductor which is also open-ended and which is capacitively connected to the movable arm of the potentiometer, both conductors lying parallel to each other.

4. The combination of two equal resistances which have a common junction, a galvanometer interconnecting the other ends of the said resistances, a first conductor one end of which is connected to one terminal of the galvanometer, a potentiometer shunting the galvanometer, a second conductor lying parallel to the first conductor, a condenser interconnecting one end of the second conductor with the movable arm of the potentiometer, the distant terminals of said conductors being open-ended, a resistance interconecting the movable arm of the potentiometer and the junction common to said two equal resistances, and a grounded source of direct current potential connected to the junction common to said two equal resistances.

5. The combination of two equal resistances which have a common junction, a galvanometer connected between the other ends of said resistances, a first conductor one end of which is connected to one terminal of the galvanometer, a potentiometer shunting the galvanometer, a second conductor lying parallel to the first conductor, a pair of equal condensers connected in series between one terminal of the second conductor and the movable arm of the potentiometer, the distant terminals of said conductors being open-ended, another resistance connected between the midpoint of said condensers and the junction of said equal resistances, and a grounded battery connected to the junction of said equal resistances.

6. The combination of testing apparatus including a galvanometer for measuring the insulation resistance of a conductor and means including a second conductor for neutralizing the effects upon the galvanometer of said apparatus of currents induced in the conductor to be measured.

7. The combination of testing apparatus for measuring the insulation resistance of a conductor, means including a second conductor for neutralizing the effects upon said apparatus of currents induced in the conductor to be tested, and means for substantially eliminating the effects upon said apparatus of leakage current in said second conductor.

8. The combination of testing apparatus for measuring the insulation resistance of a conductor, a second conductor lying parallel to the conductor being measured, said second conductor being open-ended and capacitively connected at its near end to said apparatus, and means for substantially suppressing the effect upon said apparatus of leakage current in said second conductor.

9. The method of measuring the insulation resistance of a conductor with apparatus including a galvanometer and a second conductor, which consists in simultaneously impressing upon the galvanometer potentials derived from the second conductor so as to overcome the effects of ground potentials impressed by the first conductor upon the galvanometer.

In testimony whereof, I have signed my name to this specification this 20th day of February, 1930.

PAUL G. EDWARDS.